United States Patent
Highley, Jr. et al.

[11] 3,710,342
[45] Jan. 9, 1973

[54] RECORDER CHART DRIVE

[75] Inventors: Thomas T. Highley, Jr., Glenside, Pa. 19038; Albert E. Paschkis, Gwynedd Valley, Pa. 19437

[73] Assignee: Leeds & Northrup Co., Philadelphia, Pa.

[22] Filed: March 22, 1971

[21] Appl. No.: 127,262

[52] U.S. Cl. .....................346/136, 242/75.3, 318/6
[51] Int. Cl. ..............................................G01d 15/24
[58] Field of Search ...346/136; 242/75.3, 75.2, 67.2, 242/67.3; 318/6

[56] References Cited

UNITED STATES PATENTS

| | | | |
|---|---|---|---|
| 2,937,820 | 5/1960 | Wilson | 242/75.43 |
| 3,299,435 | 1/1967 | Dawe et al. | 346/136 |

*Primary Examiner*—Joseph W. Hartary
*Attorney*—Philemon J. Moore and Raymond F. Mackay

[57] ABSTRACT

A recorder of the type for recording one or more records of the value of one or more conditions under measurement such as temperature, pressure, flow or the like upon a strip chart. A pen, pens, a stylus, stylii, or a printwheel in the case of multipoint recorders, is utilized to make a record of a condition or conditions on the chart; the recording element being moved across the chart to a position corresponding to the value of a condition. The chart is generally driven at a constant speed by means of a chart drive roll having a plurality of radially extending pins also referred to as sprocket teeth. In some instances in place of the drive roll there is a back-up plate having one or more sprocket wheels suitably displaced with respect to perforations in a chart. Such charts include adjacent at least one edge thereof a row of holes in a marginal area of the chart whereby driving engagement between the chart and the teeth or pins of the driving means cooperate to draw the chart from a supply roll passed the record applying means. The chart is thereafter drawn across a chart back-up plate by a reroll mechanism. In recorders of this type the reroll mechanism is driven slightly faster than the chart drive means either by utilizing a single motor and a chain or belt type of connection or by a separate motor. In the preferred form of applicants' invention the reroll is driven intermittently in a manner to prevent the holes in the chart from creeping off the pins of the drive means and/or jamming and/or tearing of the chart. Additionally, the intermittent reroll action permits edge guiding of the rerolled chart by the reroll flange to be fully effective.

4 Claims, 3 Drawing Figures

PATENTED JAN 9 1973

3,710,342

INVENTORS
THOMAS T. HIGHLEY JR.
ALBERT E. PASCHKIS

BY Philemon J. Moore

AGENT

RECORDER CHART DRIVE

BACKGROUND OF THE INVENTION

1. Field of the Invention

Applicants' invention is for an improved chart drive arrangement having utility with single or plural record recorders of the type generally classified in the U.S. Patent Office under recorders, record receivers and/or driving means therefore of the web type. While structures having related features may be found in other U.S. Patent Office classes, especially one relating to winding and reeling and the like, it is believed that the important patents should all appear as cross references in the category first referred to.

2. Description of the Prior Art

Strip chart recorders of the type having one or more recording pens, stylus or stylii, or a printwheel type of marking mechanism for applying a record of one or more measured quantities upon a record receiving medium generally in the form of a paper chart of the type having one or more marginal rows of accurately spaced holes to receive the pins or sprocket means of a roll chart drive, sprocket wheels or sprocket belts generally driven as a function of time have been manufactured for many, many years and are well known to those skilled in the art. An example of such a recorder chart drive mechanism is disclosed in U.S. Pat. No. 2,074,118 — R. W. Ross et al. which is assigned to applicants' assignee. In the chart drive of this particular type paper from a supply roll is threaded around detour rods, passed over a chart drive roll, down over a chart back-up plate, and rerolled on a take-up roll. The record or records are applied to the chart by a marking mechanism located in the vicinity of the chart drive roll. The chart drive roll is driven by a motor at a desired rate of speed through proper gearing and the reroll is driven at a slightly faster rate by means of a clutch which drives a sprocket wheel having a chain drive connected to a sprocket wheel on the reroll shaft. In order to maintain the perforations in the chart in engagement with the pins of the chart drive roll, slotted plates are employed to hold the chart against the chart drive roll.

U.S. Pat. No. 2,937,820 discloses a strip chart recorder of the type wherein the chart is moved from a chart supply roll by a chart drive roll which is driven at proper speed by an electric motor through gearing to obtain the desired rate of chart advance. In this recorder a separate drag motor drives the reroll tube for rewinding the chart. In this recorder a drag is placed on the chart supply roll by means of a spring biased arm thus to apply a light tension between the chart supply roll and the drive roll and the sprocket holes in the chart are maintained in proper engagement with the chart by means of controlled tension device associated with the reroll. In this recorder the means for controlling the tension at the reroll is comprised of a plate fastened to pivoted arms over which plate the chart is passed. The chart as it moves over the bottom edge of the pivoted plate initially forms a very sharp angle therewith as it begins to wind on the reroll tube and as more paper is wound on the reroll tube and the reroll tube increases in diameter more of the torque of the reroll motor is required to turn the more heavily loaded reroll tube and less is required to apply tension to the chart. The above-mentioned pivoted plate across the bottom edge of which the chart is drawn by the reroll tube has portions engaging the flanges of the reroll tube. Initially when the angle subtended between the underside of the paper drawn across the bottom edge of the pivoted plate and the inside face of the pivoted plate is small because of the small diameter of the amount of paper on the reroll tube the end edges of the plate are pulled into fairly tight engagement with the flanges of the reroll tube thus applying a braking force to regulate the tension on the chart between the drive roll and reroll in a manner intended to keep the chart from being pulled from the drive pins of the chart drive roll. As the diameter of chart on the reroll tube increases the angle between the inside face of the chart and the back of the pivoted plate increases and the torque of the reroll motor more of which is used to drive the more heavily loaded reroll receives less braking action from the pivoted plate engaging the reroll flanges so that at all times it is intended that there will be a uniform tension on the chart between the chart drive roll and the chart reroll thus to avoid pulling the chart off the pins or tearing the chart.

U.S. Pat. No. 3,009,665 is another patent which treats extensively with means intended to prevent misalignment of a recorder chart and/or pulling the chart off the pins of the chart drive roll. This recorder is of the type having a chart supply roll, a chart drive drum with pins and a reroll. In this recorder the reroll is driven at a speed slightly faster than the chart drive roll by means of a sprocket chain in a manner similar to that described in connection with U.S. Pat. No. 2,074,118. Two distinct and separate feature are employed which purportedly achieve the desired results. One end of the chart supply roll shaft 44 has a pair of flats 71. These flats 71, more clearly shown in FIG. 2, are engaged by the legs of a generally U-shaped spring 72 as described in column 5 in the patent. The purpose of this structure is alternately to apply a large amount of tension between the chart supply roll and the chart drive drum when the end of the shaft 44 is positioned with the flats as shown in FIG. 2 and as the supply roll rotates there results a much reduced tension between the chart supply roll and the chart drive roll. This mechanism cooperates with a chart guide structure or member 64 over which the chart passes in its travel between the chart drive drum and the reroll tube 66. A clutch adjustment on the chart reroll tube is intended to be made such that the chart is only slightly perforated by sharply pointed star wheels 79 which are described as engaging the chart just outside of the recording area but within the space between the recording area and the holes in the chart which cooperate with the chart drive drum. The interaction of the end structure of the chart supply drum with the flats 71 between the legs of spring 72 and the star wheels 79 on the reroll guide member 64 are intended to overcome many of the problems which have long existed in strip chart recorders with respect to the chart pulling off the pins, failing to track correctly, failing to provide smooth, tight rolls, etc.

As will be evident from the foregoing patents described somewhat in detail and in addition the modifications described in U.S. Pat. Nos. 3,031,250 and 3,365,142 which also relate to chart paper tensioning mechanisms, efforts have been put forth by many knowledgable people in the art with varying degrees of success which still leaves something to be desired.

Applicants have learned that by the simple expedient of periodically materially reducing or momentarily eliminating tension between the chart drive drum or other chart driving means and the reroll that there is achieved a chart drive mechanism wherein the sprocket holes of the chart are not pulled from the pins of the chart drive drum or sprocket wheels, the chart is rerolled in a firm and satisfactory manner, the chart runs straight, and other defects of many prior art chart drives appear to be overcome.

SUMMARY OF THE INVENTION

In accordance with applicants' invention there is provided a strip chart recorder having a chart, a chart supply station, means to draw the chart from the supply station, marking means for the application of a record to the chart, and chart reroll means including a reroll guide for rerolling the chart after application of a record thereto. The recorder additionally includes the improvement comprised of a drive means for actuation of the chart reroll means with the speed of the drive means being adequate normally to maintain tension in the chart between the means to draw the chart from the supply station and the chart reroll and including means cyclically to interrupt rotation of the drive means and actuation of the reroll periodically to relieve the tension in the chart between the chart reroll means and the means to draw the chart from the supply station thereby to prevent the chart from becoming disengaged from the means to draw the chart from the supply station and permit edge guiding of the rerolled chart by the reroll guide to be fully effective smoothly to reroll the chart.

It is more specifically an object of applicants' invention to provide a strip chart recorder having a chart supply roll and a chart reroll, a strip chart having at least one row of sprocket holes in the length thereof, chart drive means including a sprocket, and means for application of a record on the chart as it is driven by the chart drive means passed the means for application of a record on the chart. The improvement which comprises a separate motor for actuation of the chart reroll with the speed of the separate motor being adequate normally to maintain tension in the chart between the chart reroll and the chart drive means and wherein means is included cyclically to interrupt rotation of the separate motor and the reroll to permit advance of the chart by the chart drive means to relieve all tension in the chart between the chart reroll and the chart drive means to prevent the chart from climbing off the sprocket and permit edge guiding of the rerolled chart to be fully effective smoothly to reroll the chart.

BRIEF DESCRIPTION OF THE DRAWINGS

For an understanding of applicants' invention the following specification and claims should be read while referring to the accompanying drawings wherein:

DESCRIPTION OF PREFERRED EMBODIMENTS

Figure 1:
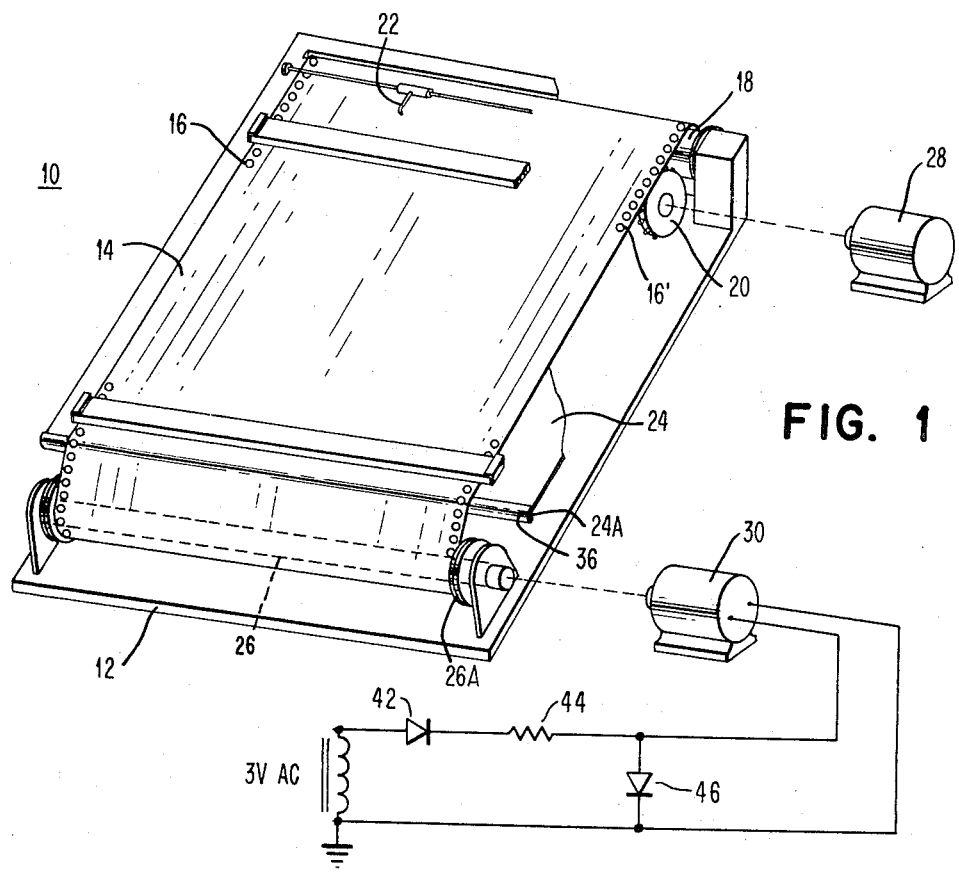
FIG. 1 is a perspective view of a strip chart recorder with many parts omitted and the right side broken away to show essential parts of a chart drive to which there has been added in diagrammatic form features of a preferred modification of applicants' invention.

In FIG. 1 there is indicated a strip chart recorder 10 with all except parts deemed essential for describing applicants' invention omitted since those skilled in the art are thoroughly familiar with the basic features of strip chart recorders of several similar types. The recorder 10 includes a frame structure 12 which supports various parts of the recorder. A strip chart 14 having sprocket holes 16,16' is supplied from a supply roll 18 and drawn by a chart drive means 20, which may be a drum with spaced pins, sprocket wheels, or belts, past a recording pen 22. While a single pen 22 is shown it is to be understood the recorder may have a plurality of pens, a print wheel, or other form of record applying means. The chart preferably passes over a chart back-up plate 24 having an edge 24A around which the chart passes to a chart reroll 26. Recorders of this general type are known to those skilled in the art and it is believed no further description thereof is necessary.

It should also be clearly understood that sometimes charts are driven by fine toothed or friction wheels and that sprocket holes in the charts are not used. With these arrangements features of applicants' invention are still useful in order to prevent skewing of the chart at the drive means and permitting edge guiding of the chart, for example, by the reroll flange to effect a smoothly rerolled chart.

In the recorder of the type shown the paper drive means 20 includes a sprocket, only one of which is shown. The sprocket or an equivalent mechanism, is generally driven as a function of time by a motor 28 through suitable gearing which has been omitted for simplification. In recorders of this type additional chart drive motors and/or gearing are supported within the recorder in order that the chart may be driven at different speeds. Since such are well known and per se form no part of the invention such mechanism is omitted.

In recorder 10 a separate motor is employed to drive the chart reroll. Broadly speaking the use of a separate motor for chart reroll is old in the art and is shown, for example, in U.S. Pat. No. 2,937,820 described above and it per se forms no part of the invention.

Reasons, many of which are known and many of which are perhaps still not fully known, have existed in recorders of the type employing charts with holes to receive the teeth of sprocket drive wheels which produce a tendency for the chart to creep off of the pins of a chart drive roll or the teeth of a sprocket drive wheel or belt, whichever the case may be. In the preferred form of applicants' invention this tendency is prevented in a manner believed to be novel by utilizing for the chart reroll drive, which applies tension on the chart, a motor 30 which is a D.C. motor driven from an A.C. source through a half wave unfiltered power supply of appropriate voltage. A motor found to be satisfactory is one obtained from Portescap U.S. designated ESCAP 20, type 030/020. This is a D.C. motor having a rating of 2 volts maximum feed voltage, a starting torque of 0.31-ounce inches, and a no load speed of 19,200 r.p.m. which when operated from the power supply indicated received voltage pulses of about 0.6 volts. A 100 to 1 gear ratio was used between the motor output shaft and the shaft of the chart reroll 26. The motor is energized intermittently at a fixed frequency which produces on the chart between the reroll 26 and drive means 20 intermittent tension having a rate of interruption of 60 cycles per second. With this arrangement the reroll motor operates somewhat less than 50 percent of the time. The supply for the motor was from a 3 volt tap on the instrument A.C. power supply. One side is grounded as shown and the other side included a rectifier 42 and a current limiting resistor 44 of 1 ohm. A voltage control diode 46 was connected across the motor terminals. It will be apparent that alternate circuitry can be employed to achieve the desired result.

In operation the motor 30 is deenergized between voltage pulses and the chart reroll 26 is momentarily stopped, however since the motor 28 continues to run and drive the sprocket of drive means 20 chart 14 continues to be fed toward reroll 26 thus periodically introducing slack in the chart between the drive means 20 and the chart reroll 26. During these short intervals when tension in the chart is materially reduced or eliminated the chart may settle back on the sprocket teeth and the outer turns of the chart on the chart reroll 26 are allowed to slide into engagement with the reroll guide comprised of the flanges 26A.

The modification of FIG. 1 has been found satisfactory and is presently preferred, however, interruption of the rotation of the reroll motor may be obtained in many other ways.

Figure 2:
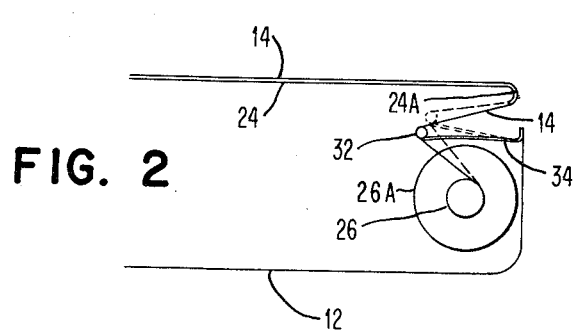
FIG. 2 is a side elevation in schematic form showing another modification of aplicants' invention.

In FIG. 2 the chart 14 is shown passing over the edge 24A of the back-up plate 24 to the reroll 26 which, as will be understood by those skilled in the art, will have suitable flanges such as 26A for guiding the paper into a smooth compact roll. Between the edge 24A and the reroll 26 is a detour bar 32 which may be a round rod supported from the frame structure 12 by means of a centrally disposed leaf spring 34. The detour bar 32 spans the width of the chart and is secured to the spring as by welding. Initially when there is no tension on the chart the detour 32 is in the dotted line position at which time the exterior angle between the surface of the chart in its dotted line position and the surface of the chart backup plate 24 will be approximately 170° as shown in FIG. 2, however, as the chart 14 is taken up by the reroll 26 the slight amount of friction between the chart and the detour bar causes the detour bar 32 to be pulled toward its lower full line position. Flexing of the leaf spring 34 creates a force which increases the pressure between the chart 14 and the detour rod 32 to such an extent that the motor (not shown) driving reroll 26 cannot overcome the friction between the two and the motor stalls. However, continued operation of the paper drive means 20 as described in connection with FIG. 1 introduces slack in the chart 14 which reduces the pressure between chart 14 and detour bar 32 until the tension of spring 34 overcomes the friction of the paper drawn over the detour bar causing the bar 32 to snap back to its dotted line position. When this happens tension in the chart is momentarily relieved and the chart may settle back on the sprocket teeth and the outer turns of the chart on the chart reroll 26 may slide into engagement with the reroll flanges 26A as described in connection with FIG. 1. The frequency of the intermittent action is a function of the chart speed and for a chart speed of about 900 inches per hour a spring made of spring temper phosphor bronze 0.025 inch thick, 2-inches wide and 2-inches long, used with a D.C. motor like that of FIG. 1 energized from a 0.7 volt D.C. supply produced a frequency of movement of the detour bar 32 between its solid and dotted line positions of the order of 2 to 4 cycles per second. As will be evident each time the detour snaps to its dotted line position, there is a momentary relaxation of the tension on the chart 14 between the drive means 20 and the reroll 26.

Figure 3:
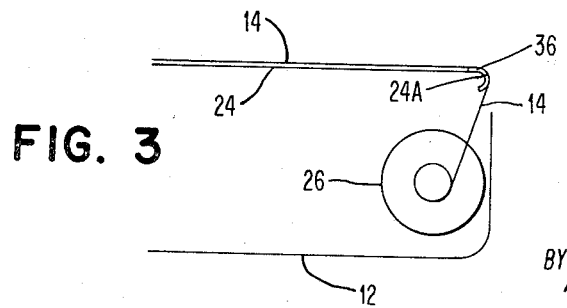
FIG. 3 is a side elevation in diagrammatic form showing still another modification of applicants' invention.

In FIG. 3 there is disclosed still another modification of applicants' invention wherein the edge 24A of the chart back-up plate 24 is covered over its entire width with a vinyl tape 36. Scotch Brand, Vinyl Plastic Electrical Tape, No. 88, Black, sold by Minnesota Mining & Manufacturing Company, U.S.A., was used. The tape produced a relatively high friction across this edge where the chart 14 is reversely directed toward the reroll 26 at an exterior angle of approximately 150° between the underside of plate 24 and the underside of the chart. With tension on the chart the vinyl tape created sufficient friction to stall the reroll motor, however, continuous operation of the motor 28 (see FIG. 1) of the paper drive means 20 introduces slack in the chart between the drive means 20 and the chart reroll 26, as described in connection with FIG. 1. This reduces the contact pressure between the chart 14 and the tape 36 and when the reroll motor pull overpowered the forces of friction the paper was again advanced, an increment before being drawn tightly against the tape to again stall the reroll motor. The result of this arrangement was a periodic relaxation of the tension between the chart drive means 20 and the reroll 26 except that the frequency was considerably higher than that achieved by the arrangement of FIG. 2. The same D.C. motor energized from a 0.7 volt D.C. supply used in FIG. 2 was used in the modification of FIG. 3.

From the foregoing description it will be apparent to those skilled in the art that many forms of the invention may be constructed and that one feature may be usefully employed with or without another to provide chart drive arrangements which periodically or cyclically substantially eliminate tension on a recorder chart between the drive means therefore and the chart reroll by interrupting rotation of the reroll drive means thus to permit the holes in the chart to seek their proper positions on the drive pins, and to permit edge guiding of the chart reroll to be fully effective.

What is claimed is:

1. A strip chart recorder having a chart, a chart supply station, means to draw the chart from the supply station, marking means for the application of a record to the chart, and chart reroll means including a reroll guide for rerolling the chart after application of a record thereto, the improvement comprising, a motor for actuation of said chart reroll means with the speed of said motor being adequate normally to maintain tension in the chart between said means to draw the chart from the supply station and said chart reroll means, and means cyclically to interrupt rotation of said motor and actuation of said chart reroll means periodically to relieve the tension in said chart between said reroll means and said means to draw the chart from the supply station thereby to prevent the chart from becoming disengaged from the means to draw the chart from said supply station, and permit edge guiding of the rerolled chart by said reroll guide to be fully effective.

2. A recorder according to claim 1 wherein said means cyclically to interrupt rotation of said motor and actuation of said chart reroll means comprises a detour bar supported by a spring, said detour bar spanning the width of said chart and supporting it at an angle so that the frictional forces pulling said detour bar downwardly increase by an amount sufficient to stall said motor.

3. A recorder according to claim 1 wherein said means cyclically to interrupt rotation of said motor and actuation of said chart reroll means comprises an edge of a chart back-up plate over which said chart is drawn prior to reception of said chart by said reroll means, said edge having a coating of friction material to retard passage of the chart upon application of tension thereto with a force sufficient to stall said motor.

4. A recorder according to claim 1 including a half-wave unfiltered power supply energizable from an A.C. source and wherein said motor is a D.C. motor intermittently energized by cyclically produced D.C. pulses from said power supply thereby to effect intermittent rotation of said chart reroll means for cyclic relief of tension between said reroll means and said means to draw the chart from the supply upon continued operation of said means to draw the chart from the supply station when said chart reroll means is stopped.

* * * * *